(12) United States Patent
Smedley et al.

(10) Patent No.: US 7,276,309 B2
(45) Date of Patent: *Oct. 2, 2007

(54) METHODS AND DEVICES FOR CONTROLLING FLOW AND PARTICLE FLUIDIZATION IN A FUEL CELL

(75) Inventors: Kent I. Smedley, San Marcos, CA (US); Ronald Gulino, San Diego, CA (US); Donald James Novkov, Encinitas, CA (US); Ethan T. Alger, Oceanside, CA (US); Jesse Rosen, San Diego, CA (US); Stuart I. Smedley, Escondido, CA (US)

(73) Assignee: Teck Cominco Metals, Ltd., Vancouver ( * ) Notice: Subject to any disclaimer, the term of this patent is extended or adjusted under 35 U.S.C. 154(b) by 563 days.

This patent is subject to a terminal disclaimer.

(21) Appl. No.: 10/661,087

(22) Filed: Sep. 12, 2003

(65) Prior Publication Data

US 2004/0126642 A1 Jul. 1, 2004

Related U.S. Application Data

(60) Provisional application No. 60/410,468, filed on Sep. 12, 2002, provisional application No. 60/410,467, filed on Sep. 12, 2002, provisional application No. 60/410,389, filed on Sep. 12, 2002.

(51) Int. Cl.
*H01M 2/38* (2006.01)
*H01M 12/06* (2006.01)

(52) U.S. Cl. .............................. 429/27; 429/15; 429/22

(58) Field of Classification Search ..................... None
See application file for complete search history.

(56) References Cited

U.S. PATENT DOCUMENTS

| 5,441,820 A | 8/1995 | Siu et al. |
|---|---|---|
| 5,477,307 A | 12/1995 | Bergen et al. |
| 5,849,427 A | 12/1998 | Siu et al. |
| 5,952,117 A | 9/1999 | Colborn et al. |
| 6,153,329 A | 11/2000 | Raschilla et al. |
| 6,162,555 A | 12/2000 | Gutierrez et al. |
| 6,764,588 B2 * | 7/2004 | Smedley et al. ............ 205/343 |
| 2002/0045075 A1 | 4/2002 | Pinto et al. |

* cited by examiner

*Primary Examiner*—Jonathan Crepeau
(74) *Attorney, Agent, or Firm*—Sean D. Burdick; Snell & Wilmer L.L.P.

(57) ABSTRACT

Improved fuel cell systems comprise a fuel delivery system having a fluidization apparatus and a fluidization pump for creating an electrolyte flow suitable for fluidizing at least a portion of the fuel particles located within the fluidization apparatus. Due to the presence of the fluidization pump and the fuel delivery pump, the degree of fluidization of the fuel particles can be controlled independently of the overall electrolyte flow rate provided to the cell stacks. In other words, the mass flow rate of fuel particles through the fuel cell can be varied independently from the total flow rate through the fuel cell system. The fluidization of fuel particles can facilitate suitable mixing of fuel particles and electrolyte and can prevent fuel particle agglomeration, which can clog the fuel cell piping system. In some embodiments, a splitter element can be positioned within the container to divide the fuel and electrolyte flow exiting the container into multiple flows, which prevents the blockage of one pathway from completely starving the cell stacks of fuel and electrolyte.

23 Claims, 14 Drawing Sheets

Pellets remaining in hopper (kg)

Pellets remaining in hopper (kg)

Pellets remaining in hopper (kg)

METHODS AND DEVICES FOR CONTROLLING FLOW AND PARTICLE FLUIDIZATION IN A FUEL CELL

CROSS-REFERENCE TO RELATED APPLICATIONS

The current application claims the benefit of priority from U.S. provisional patent application filed on Sep. 12, 2002, entitled "Fluidized Bed Particle Delivery System" having Ser. No. 60/410,468, from U.S. provisional patent application filed on Sep. 12, 2002, entitled "Method Of Controlling Flow And Particle Fluidization In A Metal-Air Fuel Cell" having Ser. No. 60/410,467 and from U.S. provisional patent application also filed on Sep. 12, 2002, entitled "Down Jet Feeding Mechanism" having Ser. No. 60/410,389, all three of which are incorporated herein by reference.

FIELD OF THE INVENTION

The invention relates to methods and devices for controlling electrolyte flow and particle fluidization in a fuel cell system. In particular, the invention relates to methods and devices for controlling the fluidization of metal fuel particles for flow through a tube, such as for a fuel delivery to metal-air fuel cell. Additionally, the invention pertains to devices that reduce fuel clogging and electrode starvation.

BACKGROUND OF THE INVENTION

In general, a fuel cell is an electrochemical device that can convert chemical energy stored in fuels such as hydrogen, methane, zinc, aluminum and the like, into useful energy. A fuel cell generally comprises a negative electrode, a positive electrode, and a separator within an appropriate container. Fuel cells operate by utilizing chemical reactions that occur at each electrode. In general, electrons are generated at the anode and current flows through an external circuit to the cathode where a reduction reaction takes place. The electrochemical potential difference between the two electrodes can be used to drive useful work in the external circuit. For example, in one embodiment of a fuel cell employing metal, such as zinc, iron, lithium and/or aluminum, as a fuel and potassium hydroxide as the electrolyte, the oxidation of the metal to form an oxide or a hydroxide takes place at the anode. In commercial embodiments, several fuel cells are usually arranged in series, or stacked, in order to create larger voltages. For commercially viable fuel cells, it is desirable to have electrodes that can function within desirable parameters for extended periods of time on the order of 1000 hours or greater.

A fuel cell is similar to a battery in that both generally have a positive electrode, a negative electrode and electrolytes. However, a fuel cell is different from a battery in the sense that the fuel in a fuel cell can be replaced without disassembling the cell to keep the cell operating. In some embodiments, a fuel cell can be coupled to, or contain, a fuel regeneration unit which can provide the fuel cell with regenerated fuels. In some fuel cells, the fuel can be stored in a container that is connected to the electrochemical cell stacks.

Fuel cells are a particularly attractive power supply because they can be efficient, environmentally safe and completely renewable. Metal/air fuel cells can be used for both stationary and mobile applications, such as all types of electric vehicles. Fuel cells offer advantages over internal combustion engines, such as zero emissions, lower maintenance costs and higher specific energies. Higher specific energies associated with selected fuels can result in weight reductions. In addition, fuel cells can give vehicle designers additional flexibility to distribute weight for optimizing vehicle dynamics.

SUMMARY OF THE INVENTION

In a first aspect the invention pertains to a fuel cell system comprising a fluidization apparatus having therein metal particles and electrolyte, an electrochemical cell stack in fluid communication with the fluidization apparatus, a fuel delivery pump and a fluidization pump. In these embodiments, the electrochemical cell stack comprises an anode and a cathode. Additionally, the fluidization pump can provide a stream comprising electrolyte to the fluidization apparatus at an orientation suitable for fluidizing at least a portion of the metal particles in the fluidization apparatus. A portion of the fluidized metal particles can be delivered to the electrochemical cell stack by the fuel delivery pump.

In another aspect, the invention pertains to a particle delivery system comprising a fluidization apparatus having therein metal particles and electrolyte. In these embodiments, the fluidization apparatus comprises a spout tube having a first end and a second end, a fluidization jet oriented towards the first end of the spout tube, and a feed tube positioned near the second end of the spout tube, wherein the feed tube passes through the surface of the fluidization apparatus and provides a flow path out of the container, and wherein the feed tube comprises an opening positioned to receive a portion of the fluidized particles.

In a further aspect, the invention pertains to a container for a fuel cell system comprising fuel particles and electrolyte located within the container, a flow tube and a splitter element comprising a plurality of openings that permit fuel particles and electrolyte to flow out of the container. In these embodiments, the container can further comprise a plurality of suction tubes connected to the plurality of openings, wherein the plurality of suction tubes converge to connect the flow tube to the plurality of openings such that a multiple path from the container to the flow tube is created.

In another aspect, the invention relates to a method of delivering fuel and electrolyte to an electrochemical cell stack comprising fluidizing metal particles with a stream comprising electrolyte and flowing the fluidized particles to the electrochemical cell stack. In these embodiments, the stream can be provided to a fluidization apparatus having therein metal particles and electrolyte.

DETAILED DESCRIPTION OF THE INVENTION

Figure 1:
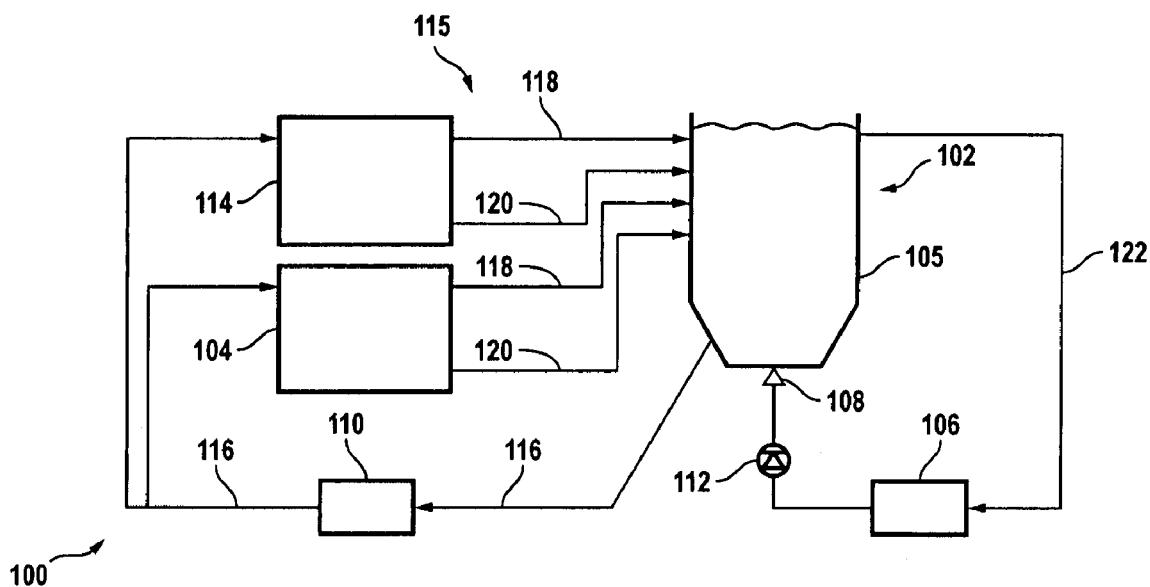
FIG. 1 shows a schematic view of an embodiment of fuel cell system having a fluidization pump and a fuel delivery pump.

Improved fuel cell systems comprise a fuel delivery system having a fluidization apparatus and a fluidization pump for creating an electrolyte flow suitable for fluidizing at least a portion of the fuel particles located within the fluidization apparatus. Generally, the fuel delivery system further comprise a fuel delivery pump, which can supply electrolyte and at least a portion of the fluidized fuel particles to another component of the fuel cell system, such as a electrochemical cell stack. Additionally, the fuel cell system can further comprise one or more electrochemical cell stacks, a piping system for connecting the fluidization apparatus to the electrochemical stacks and other components such as, for example, a regeneration unit. Due to the presence of the fluidization pump and the fuel delivery pump, the degree of fluidization of the fuel particles can be controlled independently of the overall electrolyte flow rate provided to the cell stacks. In other words, the mass flow rate of fuel particles through the fuel cell can be varied independently from the total flow rate through the fuel cell system. The fluidization of fuel particles can facilitate suitable mixing of fuel particles and electrolyte and can prevent fuel particle agglomeration, which can clog the fuel cell piping system. In some embodiments, a splitter element can be positioned within the container to divide the fuel and electrolyte flow exiting the container into multiple flows, which prevents the blockage of one pathway from completely starving the cell stacks of fuel and electrolyte.

In general, there are several types of fuels, i.e., reducing agents, typically employed in electrochemical cells including, for example, hydrogen, direct methanol and metal-based fuel systems. A metal-based fuel cell is an electrochemical cell that uses a metal, such as zinc particles, as fuel in the anode. In a metal-based fuel cell, the fuel is generally stored, transported and used in the presence of a reaction medium or electrolyte, such as potassium hydroxide solution. The zinc metal or other metal fuels is generally in the form of particles to allow for sufficient flow of the zinc fuel through the fuel cell. Specifically, in metal/air batteries and metal/air fuel cells, oxygen is reduced at the cathode, and metal is oxidized at the anode. In some embodiments, oxygen is supplied as air. For convenience, air and oxygen are used interchangeably throughout unless otherwise noted. In other embodiments, the oxidizing agent supplied to the cathode may be bromine gas or other suitable oxidizing agents. In some embodiments, the fuel compositions may further include additional additives, such as stabilizers and/or discharge enhancers.

In general, gas diffusion electrodes are suitable for catalyzing the reduction of gaseous oxidizing agents, such as oxygen, at a cathode of a metal fuel cell or battery. In some embodiments, gas diffusion electrodes comprise an active layer associated with a backing layer. The active and backing layers of a gas diffusion electrode are porous to gases such that gases can penetrate through the backing layer and into the active layer. However, the backing layer of the electrode is generally sufficiently hydrophobic to prevent diffusion of the electrolyte solution into or through the backing layer. The active layer generally comprises catalyst particles for catalyzing the reduction of a gaseous oxidizing agent, electrically conductive particles such as, for example, conductive carbon and a polymeric binder. Gas diffusion electrodes suitable for use in metal/air fuel cells are generally described in application Ser. No. 10/364,768, now abandoned filed on Feb. 11, 2003, titled "Fuel Cell Electrode Assembly," and in application Ser. No. 10/288,392, now abandoned filed on Nov. 5, 2002, titled "Gas Diffusion Electrodes," both of which are incorporated herein by reference.

In metal/air fuel cells that utilize zinc as the fuel, the following reaction can take place at the anodes:

$$Zn + 4OH^- \rightarrow Zn(OH)_4^{2-} + 2e^- \qquad (1)$$

The two released electrons flow through a load to the cathode where the following reaction can take place:

$$\frac{1}{2}O_2 + 2e^- + H_2O \rightarrow 2OH^- \qquad (2)$$

The reaction product is the zincate ion, $Zn(OH)_4^{2-}$, which is soluble in the reaction solution KOH. The overall reaction which occurs in the cell cavities is the combination of the two reactions (1) and (2). This combined reaction can be expressed as follows:

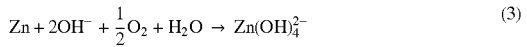
$$Zn + 2OH^- + \frac{1}{2}O_2 + H_2O \rightarrow Zn(OH)_4^{2-} \qquad (3)$$

Alternatively, the zincate ion, $Zn(OH)_4^{2-}$, can be allowed to precipitate to zinc oxide, ZnO, a second reaction product, in accordance with the following reaction:

$$Zn(OH)_4^{2-} \rightarrow ZnO + H_2O + 2OH^- \qquad (4)$$

In this case, the overall reaction which occurs in the cell cavities is the combination of the three reactions (1), (2), and (4). This overall reaction can be expressed as follows:

$$Zn + \frac{1}{2}O_2 \rightarrow ZnO \quad (5)$$

Under ambient conditions, the oxidation of zinc and the reduction of oxygen yield an open-circuit voltage potential of about 1.4V. Further embodiments of a zinc/air batteries or fuel cells are generally described U.S. Pat. Nos. 5,952,117; 6,153,329; and 6,162,555, which are incorporated by reference herein.

Generally, the fuel is transported to the cells in an aqueous electrolyte such as, for example, a potassium hydroxide solution. Additionally, fuel particles may agglomerate and form larger fuel particles, which can obstruct the pipes and flow pathways of a fuel cell system. This obstruction of the fuel cell flow pathways can lead to electrode starvation and cell failure. Clogs in the fuel cell system can also occur when the flow rate through the fuel cell is too low. When clogs form in the piping system of fuel cell, desired levels of fuel and electrolyte can be prevented from reaching the cell stack, which can lead to electrolyte starvation and cell failure. Additionally, if the flow rate of the fuel and electrolyte is too high, the anode beds of cell stack can be damaged by the scouring effect of the fuel particles. As a result, there is a range of desirable flow rates through the cell stacks that reduces clogs and prevents the undesirable scouring of the anode beds. As described herein, one way of adjusting the flow rate of the fuel particles and electrolyte is to employ a fuel cell system with a fuel delivery apparatus comprising a fluidization pump connected to a fluidization apparatus and a fuel delivery pump connecting the fluidization apparatus and the fuel cell. Additionally, clogs can be reduced by employing a splitter element which splits the fuel particle and electrolyte flow into multiple flow paths.

Fuel Cell Systems and Fluid Delivery Systems

The fuel cell systems of the present disclosure generally comprise an electrochemical cell stack, a fluid delivery system having a fluidization pump and a fuel delivery pump, and a piping system connecting the electrochemical cell stack to the fluid delivery system. The fluidization pump, and associated fluidization jet, can create an electrolyte flow stream in the fluidization apparatus suitable for fluidizing a portion of the fuel particles located in a fluidization apparatus, and entraining particles within an electrolyte flow to the cell stacks. In one embodiment, a feed tube is located in the fluidization apparatus and operably connected to the fuel delivery pump, such that a portion of the fluidized fuel particles can be pumped out the fluidization apparatus and provided to another component of the fuel cell system, such as an electrochemical cell stack. In some embodiments, fuel particles that do not enter the feed tube can be directed towards the bottom of the fluidization apparatus by a baffle, where the particles can be re-fluidized by the incoming electrolyte stream from the fluidization jet. In some embodiments, the baffle can also split the flow and redirect metal particles. The fluidization of the fuel particles can provide steady re-circulation of the fuel particles within the fluidization apparatus, which can reduce agglomeration of the fuel particles and can provide suitable mixing of the electrolyte.

In some embodiments, the containers of the present invention comprise a downward pointing fluidization jet which creates an electrolyte stream suitable for entraining a portion of the fuel particles located in the container. A redirection tube can be positioned such that the flow of the fuel particles and electrolyte enters one end of the redirection tube and is redirected into a fluidization tube which is connected to the opposite end of the redirection tube. Generally, the internal diameter of the fluidization tube is larger than the internal diameter of the redirection tube such that a fluidization zone is created as the fuel particles enter the fluidization tube.

Referring to FIG. 1, a schematic fuel cell system 100 is shown comprising fluid delivery apparatus 102, first electrochemical cell stack 104, second electrochemical cell stack 114, and piping system 115. Piping system 115 comprises fluid delivery conduits 116 and return lines 118, 120. As shown in FIG. 1, fluid delivery system 102 comprises fluidization apparatus 105, fluidization pump 106, fluidization jet 108, fuel delivery pump 110 and fluid delivery conduits 116. In some embodiments, fluid delivery system 102 can further comprise check valve 112 and fluidization input line 122. In some embodiments, fluidization apparatus 105 can contain a mixture of fuel particles, such as zinc or aluminum, in a suitable electrolyte. As shown in FIG. 1, electrolyte substantially free of particles can be provided to fluidization pump 106 from fluidization apparatus 105 via fluidization input line 122. Fluidization pump 106 can pump the electrolyte into fluidization apparatus 105 through fluidization jet 108 which creates a pressurized stream of electrolyte suitable for entraining or fluidizing a portion of the metal particles. Fluidized fuel and electrolyte can be drawn out of fluidization apparatus 105 with fuel delivery pump 110 via flow output line 116. As shown in FIG. 1, flow output line 116 can be connected to one or more electrochemical cell stacks to supply the electrochemical stack(s) with fuel and electrolyte. Although FIG. 1 shows an embodiment with two electrochemical cells connected to a fluidization apparatus, one of ordinary skill in the art will recognize that no particular number of electrochemical cell stacks is required by the present disclosure.

Electrochemical cells stacks 104, 114 can be connected to fluidization apparatus 105 by return lines 118, 120. In some embodiments, return line 118 can contain electrolyte and reacted fuel compounds from the anode beds of the cell stack, while return line 120 can contain electrolyte and un-reacted fuel particles. In one embodiment, return line 120 may pass through an orifice between the cell stack(s) and apparatus 105 in order to control the pressure upstream of the orifice.

In this embodiment, the degree of particle fluidization, and thus the volume fraction of particles to electrolyte, is a function of the flow rate through the fluidization jet. As a result, the mass flow rate of the fuel particles can be varied independently of the total flow rate through the cell stack(s). Total flow rate is independently controlled with fuel delivery pump 110.

Figure 2:
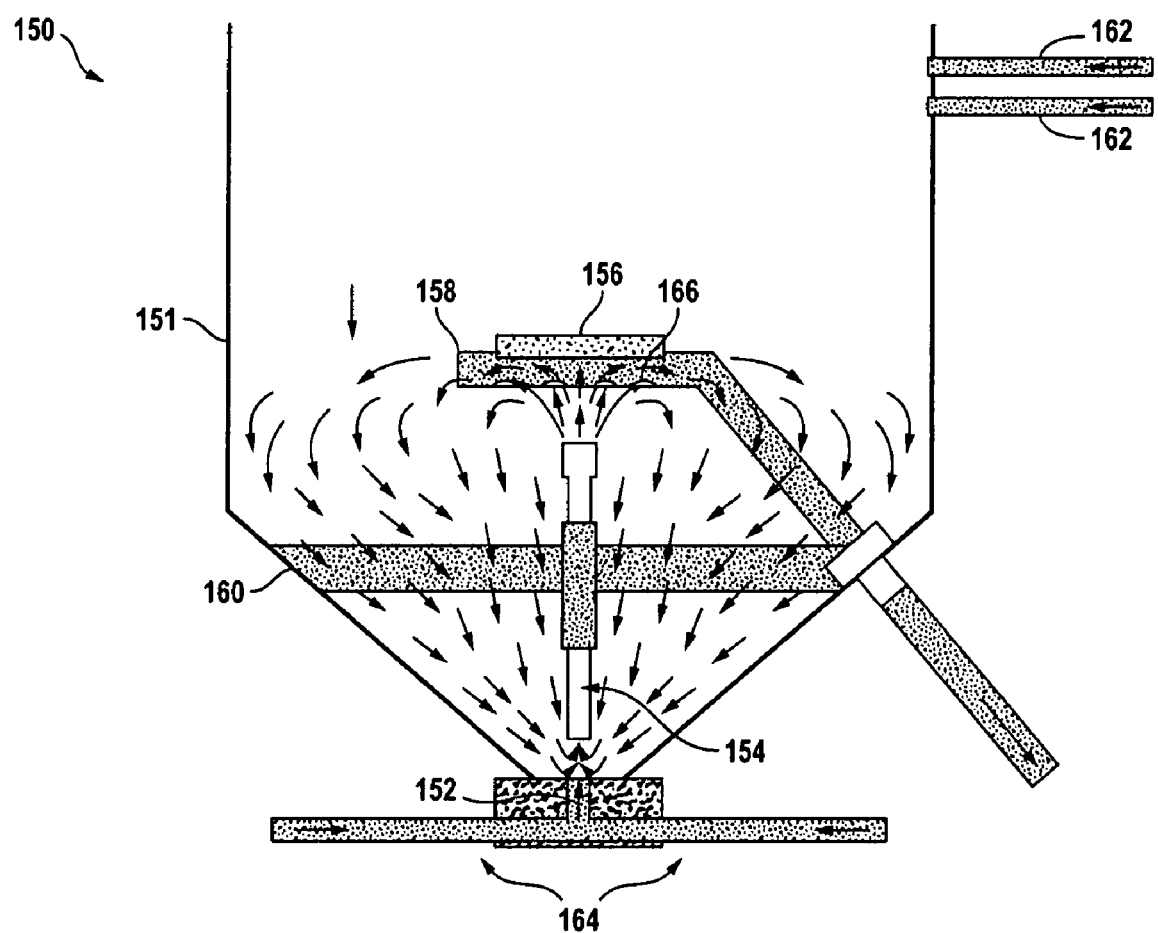
FIG. 2 is a cross-sectional view of one embodiment of a fluidization apparatus having a spout tube and a feed tube.

An embodiment of a fluid delivery system 150 that can be incorporated into fuel cell system 100 is shown in FIG. 2. As shown in FIG. 2, fluid delivery system 150 comprises fluidization apparatus 151, fluidization jet 152, spout tube 154, baffle 156, feed tube 158 and spout tube support 160. Fluid delivery system 150 can further comprise fuel inlet 162 and electrolyte inlet 164. In some embodiments, fuel inlet 162 provides a flow path for electrolyte and reaction products from the anode bed of an electrochemical cell stack to fluidization apparatus 151, while electrolyte inlet 164 can provide a flow pathway for electrolyte and un-reacted fuel particles from a cell stack to fluidization jet 152 Alternatively, electrolyte inlet 164 can provide a pathway for electrolyte from fluidization apparatus 151 to fluidization jet 152. In some embodiments, fuel inlets 162 can be used as lines 118, 120 of FIG. 1, while electrolyte inlet 164 can be used as line 122 of FIG. 1. Generally, a fluidization pump can be associated with electrolyte inlet 164 to control the flow rate of electrolyte and/or electrolyte/fuel mixtures to fluidization jet 152. In some embodiments, baffle 156 can be attached to pellet feed tube 158 such that pellet feed tube 158 is supported and held in a desired position by baffle 156. Additionally, baffle 156 can redirect fluidized fuel pellets that do not enter feed tube 158 back towards the bottom of fluidization apparatus 151. In one embodiment, feed tube 158 can comprise one or more feed holes 166 which allow fluidized fuel particles and electrolyte to pass into the interior of feed tube 158. Generally, feed tube 158 passes through a surface of fluidization apparatus 151 and provides a flow pathway for fluidized fuel particles and electrolyte out of apparatus 151. Generally feed tube 158 is connected to a fuel delivery pump which facilitates the flow of fluid out of apparatus 151. Additionally, spout tube support 160 can be provided to hold spout tube 154 in a desired position within fluidization apparatus 151.

An electrolyte stream entering fluidization apparatus 151 via fluidization jet 152 can fluidize fuel particles located near the bottom of apparatus 151. At least a portion of the fluidized fuel particles and electrolyte can be directed through spout tube 154 to a location in apparatus 151 near feed tube 158. A portion of the fluidized fuel particles exiting spout tube 154 near feed tube 158 can pass into the interior of feed tube 158 via pellet feed hole(s) 166. Fluidized fuel particles and electrolyte located within the interior of feed tube 158 can be provided, via a fuel delivery pump, to one or more electrochemical cell stacks. Additionally, fluidized fuel particles that do not enter feed tube 158 through pellet feed hole(s) 166 can contact baffle 156 and be redirected towards the bottom of apparatus 151, where the fuel particles can be re-fluidized by incoming electrolyte from fluidization jet 152. As shown in FIG. 2, the walls of the lower portion of fluidization apparatus 151 can be sloped to facilitate fuel particle accumulation near fluidization jet 152. The sloped walls increase the percentage of fuel particles located with apparatus 151 that can be fluidized by directing the particles towards fluidization jet 152.

Figure 3:
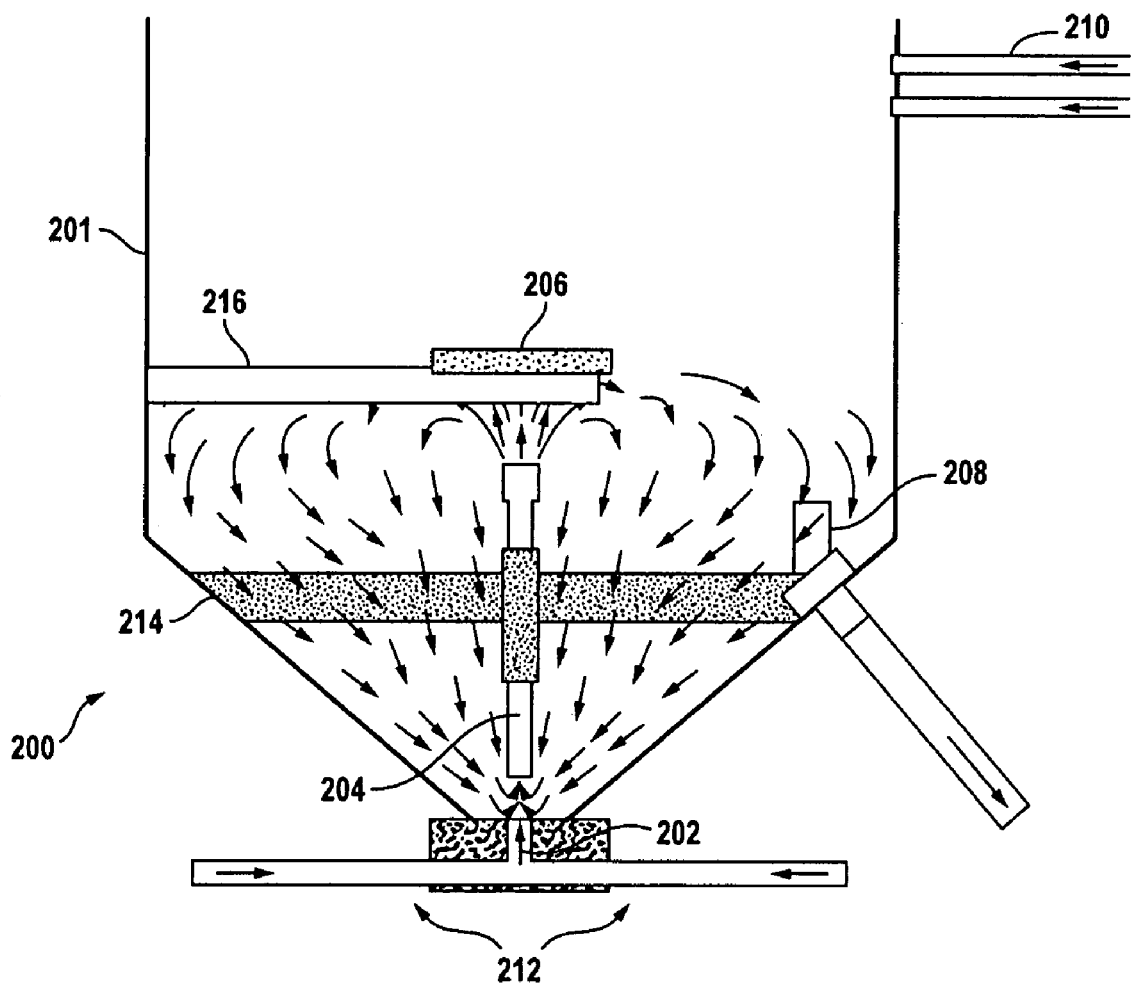
FIG. 3 is a cross-sectional view of another embodiment of a fluidization apparatus having a spout tube and a feed tube.

Referring to FIG. 3, another embodiment of a fluid delivery system 200 is shown which can be used with fuel cell system 100. As shown in FIG. 3, fluid delivery system 200 comprises fluidization apparatus 201, fluidization jet 202, spout tube 204, baffle 206 and feed tube 208. Generally, metal fuel particles and electrolyte are located inside fluidization apparatus 201. In some embodiments, fluid delivery system 200 can further comprise fuel inlets 210 and electrolyte inlet 212, which can provide fuel and electrolyte to apparatus 201. In one embodiment, inlets 210, 212 can be connected to an electrochemical cell stack such that fuel inlet 210 provides a flow path for electrolyte and reaction products from the anode bed of an electrochemical cell stack to apparatus 201, while electrolyte inlet 212 can provide a flow pathway for electrolyte and un-reacted fuel particles from a cell stack to fluidization jet 202. In other embodiments, electrolyte input 212 can provide a flow pathway for electrolyte to fluidization jet 202 from fluidization apparatus 201. In some embodiments, fuel inputs 210 can be used a lines 118, 120 of FIG. 1, while electrolyte input 212 can be used as line 122 of FIG. 1. In other embodiments, fuel inlets 210, 212 can be connected to one or more regeneration units and/or a fuel and electrolyte storage containers, which can supply fluidization apparatus 201 with fuel particles and electrolyte. Additionally, fluid delivery system 200 may further comprise spout tube support 214 and baffle support 216 which hold and position spout tube 204 and baffle 206, respectively. As shown in FIG. 3, feed tube 208 comprises an open tube located in the apparatus. Generally, feed tube 208 passes through a surface of fluidization apparatus 201 and provides a flow path for fuel particles and electrolyte out of the container. A fuel delivery pump can be connected to feed tube 208 to facilitate the flow of fluids out of fluidization apparatus 201.

An electrolyte stream entering fluidization apparatus 201 through fluidization jet 202 can fluidize a portion of the fuel particles in apparatus 201 located near fluidization jet 202. The fluidized particles can enter spout tube 204 at the end located near fluidization jet 202, and exit spout tube at the end adjacent baffle 206. Once the fluidized particles exit spout tube 202, the particle flow can be redirected by baffle 206, baffle support 216, or a combination thereof. As shown by the arrows in FIG. 3, a portion of the redirected fluidized fuel particles can enter feed tube 208, where the particles can pass through a surface of apparatus 201 and be delivered to another component of a fuel cell system, such as the fuel cell stack(s).

Figure 4:
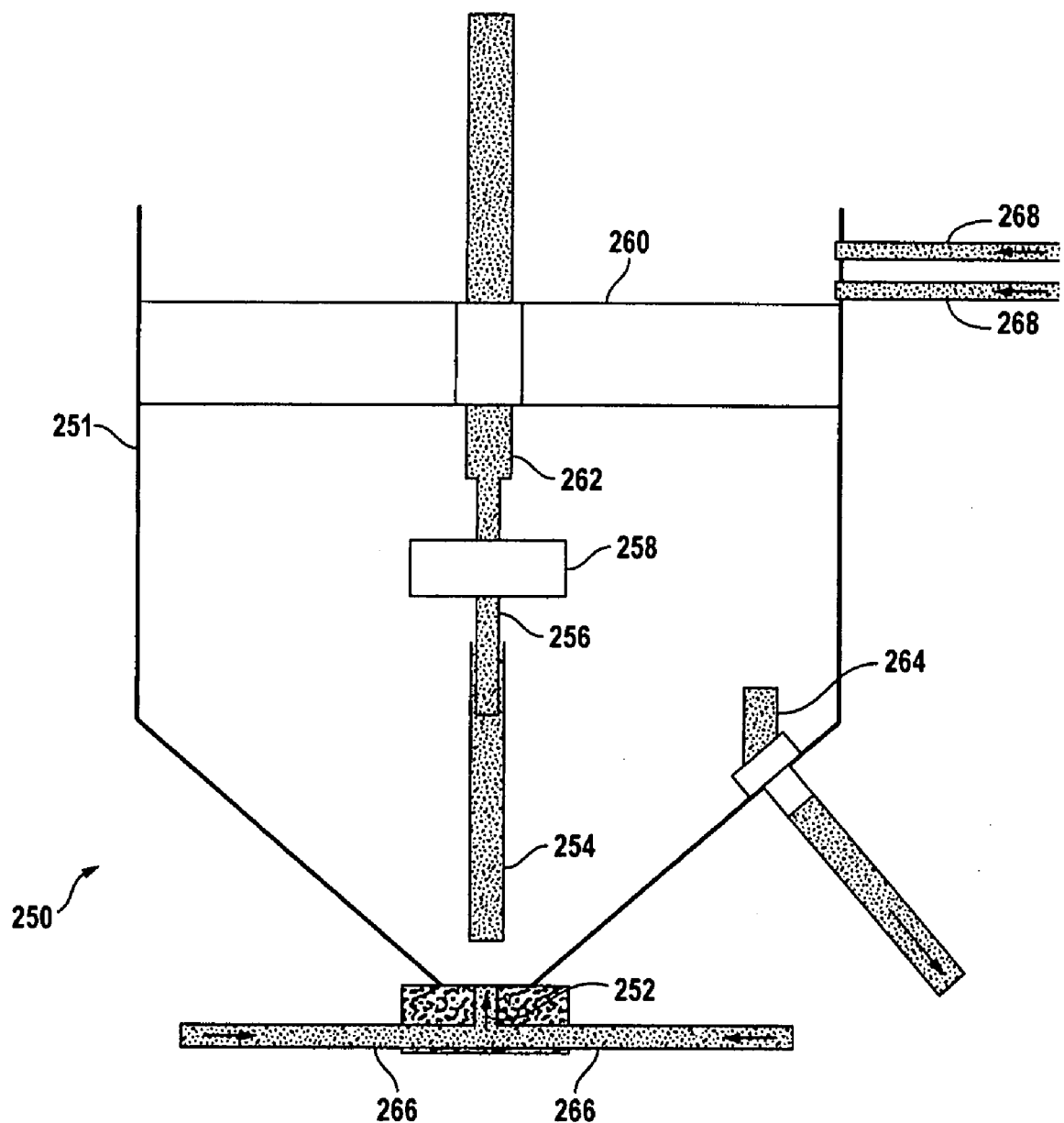
FIG. 4 is a cross-sectional view of an embodiment of a fluidization apparatus having a baffle support positioned above a baffle and spout tube.

Referring to FIG. 4, another embodiment of a fluid delivery system 250 that can be incorporated into fuel system 100 is shown comprising fluidization apparatus 251, fluidization jet 252, spout tube 254, spout tube support 256, baffle 258 and baffle support 260. Additionally, fluid delivery system 250 can further comprise baffle support rod 262, feed tube 264, and feed inlets 266, 268. Generally, one end of spout tube 254 can be positioned near fluidization jet 252 such that a portion of the electrolyte stream entering fluidization apparatus 251 via fluidization jet 252 flows into spout tube 254. In some embodiments, spout tube support 256 can comprise a rod with an external diameter less than the internal diameter of spout tube 254, which permits support 256 to be inserted into spout tube 254 without completely obstructing fluid flow through spout tube 254. Baffle 258 is positioned adjacent one end of spout tube 254 to redirect the flow of fluid, such as fluidized fuel and electrolyte, exiting spout tube 254. As shown in FIG. 4, baffle 258 is attached to spout tube support 256 which holds baffle 258 in a desired position within fluidization apparatus 251. Spout tube support 256 can be attached to baffle support rod 262. In some embodiments, baffle support rod 262 can be held in a desired position within fluidization apparatus 251 by baffle support 260. As shown in FIG. 4, baffle 258 and spout tube 254 can be connected to spout tube support 256, which allows the distance between spout tube 254 and baffle 258 to remain constant. Additionally, the design of fluid delivery system 250 permits baffle support 260 to be positioned above the flow path of the fluidized fuel particles, which, helps reduce flow disruption that can occur when baffle support 260 is positioned within the flow of the fluidized fuel particles.

Generally, electrolyte inlets 266 can be connected to, for example, an electrochemical cell stack such that un-reacted fuel and electrolyte exiting the cell stack can be provided to fluidization jet 252. Alternatively electrolyte inlets 266 can be connected to fluidization apparatus 251 to provide electrolyte or electrolyte/fuel mixtures to fluidization jet 252. Similarly, fuel inlets 268 can be connected to an electrochemical cell to provide reacted fuel and electrolyte to fluidization apparatus 251. In some embodiments, fuel inlets 268 can be used as lines 118, 120 of FIG. 1, while electrolyte inputs 266 can be used as line 122 of FIG. 1. During operation, an electrolyte stream can be pumped through fluidization jet 252 into apparatus 251, which can fluidize a portion of the fuel particles located near fluidization jet 252. Some of the fluidized fuel particles can flow through spout tube 254 and contact baffle 258. Baffle 258 can redirect the fluidized fuel particles towards the bottom of the tank such that some of the redirected fuel particles can enter feed tube 264, which passes through a surface of fluidization apparatus 251. The fluidized fuel particles that do not enter feed tube 264 can accumulate near the bottom of fluidization apparatus 251 where they can be re-fluidized by the incoming electrolyte stream.

Referring to FIGS. 2-4, the position of the respective baffles, spout tubes, feed tubes, as well as the length and diameter of the spout tube and the feed tube can have an effect on pellet mass flow rate. Generally, the position of the spout tube, feed tube and baffle, and the diameter of the spout tube and feed tube will be guided by the mass flow rate requirements of a particular electrochemical cell system. For example, placing the feed tube closer to the baffle and/or increasing the diameter of the feed tube increases the mass flow rate of the fluidized fuel particles, while positioning the feed tube father away from the baffle and/or reducing the diameter of the feed tube decreases the mass flow rate of the fluidized fuel particles. Additionally, increasing the internal diameter of the spout tube generally increases the mass flow rate, while decreasing the internal diameter of the spout tube decreases the mass flow rate.

In general, the metal particle mass flow rate is influenced by the number of particles in the jet and how many of those particles are pulled out of the jet into the feed tube. The number of particles or pellets entrained in the jet is dependent on the physical characteristics of the jet nozzle and the characteristics of the tank surrounding the jet. The number of entrained particles is also dependent on the flow rate of the jet, the diameter and the relative position of the spout tube and the conformation of the spout at its end near the jet. The number of particles collected from the jet depends on the baffle design and the location and physical characteristics of the feed tube and the flow rate through the feed tube.

Figure 5:
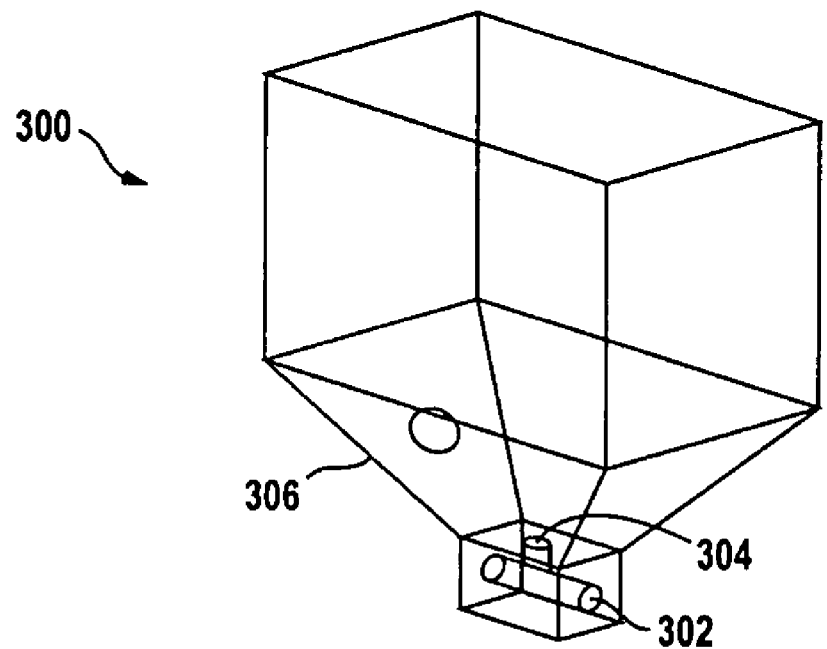
FIG. 5 is a perspective view of the outside shape of the fluidization apparatus of FIGS. 2-4 showing the lower portion of the walls having a slope.
Figure 6:
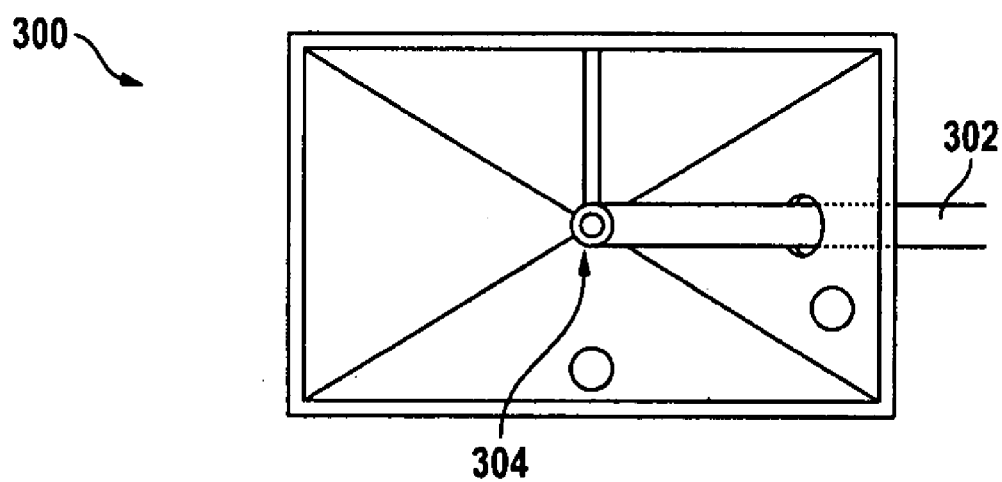
FIG. 6 is a top view of the inside of FIGS. 2-4 showing the position of the fluidization jet.

Referring to FIGS. 5 and 6, a top view and a perspective view of the shape of the fluidization apparatuses of FIGS. 2-4 are shown. As shown in FIG. 5, fluidization apparatus 300 comprises fuel inlets 302 and fluidization jet 304 located near the bottom of apparatus 300. In some embodiments, the lower portions of walls 306 of fluidization apparatus 300 are sloped, which facilitates fluidization of the fuel particles by directing the flow of fuel particles towards fluidization jet 304. In some embodiments, the slope of the lower portion of the apparatus walls 306 can be from about 25 to about 75 degrees, while in other embodiments the slope can be from about 40 to about 60 degrees. One of ordinary skill in the art will recognize that additional ranges of the slope of the portion of the apparatus walls are contemplated and are within the scope of the present disclosure. As shown in FIG. 6, in some embodiments, fluidization jet 304 can be positioned in the center of fluidization apparatus 300.

Figure 7:
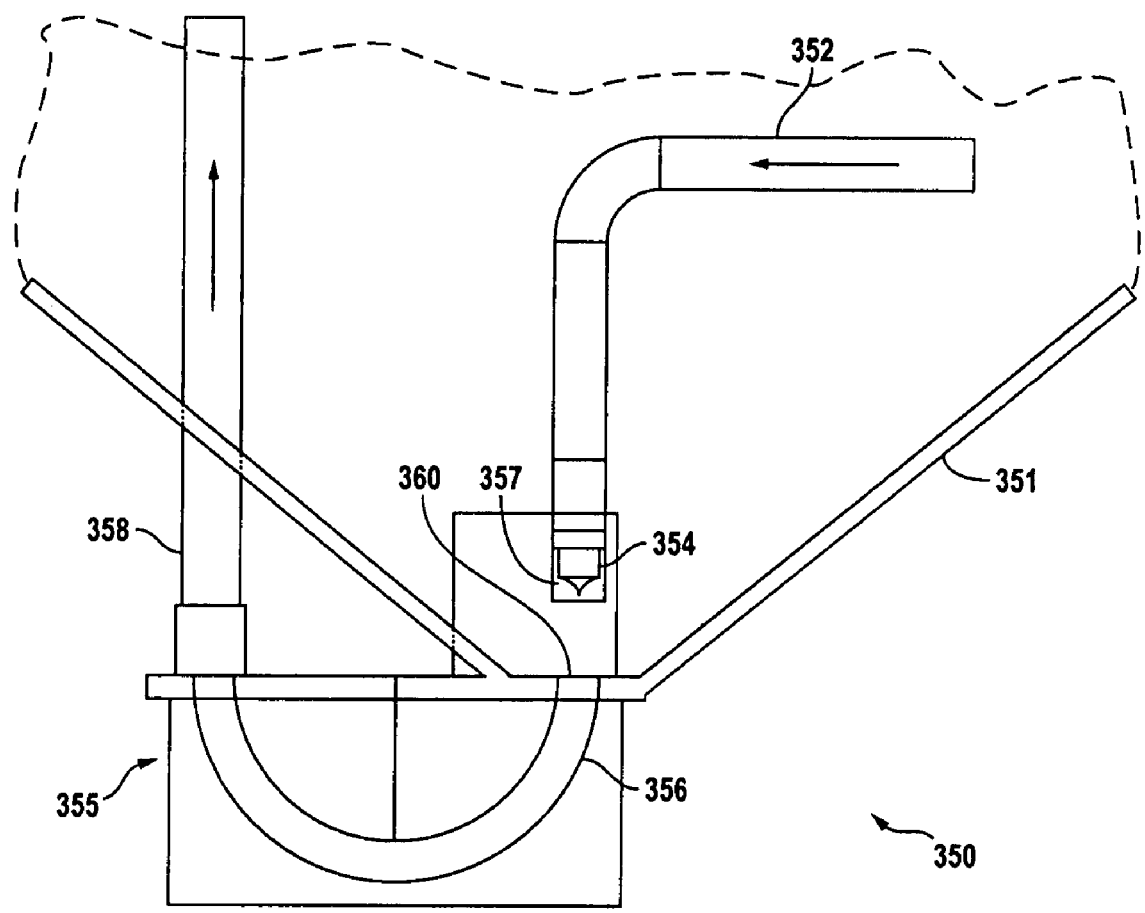
FIG. 7 shows a cross-sectional view of a fluidization apparatus having a fluidization jet pointing in a downward direction.

FIG. 7 shows another embodiment of a fluid delivery system 350 suitable for use with the fuel cell system 100. As shown in FIG. 7, fluid delivery system 350 comprises fluidization apparatus 351, inlet tube 352, fluidization jet 354 and feed tube 355. As shown in FIG. 7, feed tube 355 comprises redirection tube 356 and fluidization tube 358. Fluidization jet 354 can be pointed downwards to provide an electrolyte stream to the lower portion of fluidization apparatus 351. In one embodiment, fluidization jet 354 can be pointed straight down, however, other embodiments exist where fluidization jet 354 is pointed in a generally downward direction at an angle below the horizontal. Collar 357 can extend at least to the edge of the jet and generally extends downward past the jet. Collar 357 prevents sufficient contact with metal particles, prior to the initiation of the fluidization process, such that the particles do not block flow from the jet. Opening 360 can be located beneath fluidization jet 354 such that a portion of the electrolyte stream exiting fluidization jet 354 can pass through opening 360 into one end of redirection tube 356. In some embodiments, fluidization jet 354 can be positioned from about 0.25 to about 5 inches from opening 360, while in other embodiments the fluidization jet can be positioned from about 0.5 to about 1 inch from opening 360. One of ordinary skill in the art will recognize that additional ranges of fluidization jet location relative to the opening within these explicit ranges are contemplated and are within the scope of the present disclosure.

As described above, one end of redirection tube 356 abuts opening 360 in fluidization apparatus 351. The other end of redirection tube 356 is connected to fluidization tube 358, which provides a flow pathway for fluidized fuel particles and electrolyte from fluidization apparatus 351 to fluidization tube 358. Generally, fluidization tube 358 has a larger internal diameter than the internal diameter of redirection tube 356. The change in area between redirection tube 356 and fluidization tube 358 creates a fluidization zone which reduces the pressure required to clear feed tube 355 of packed particles. In one embodiment, redirection tube 356 can have an internal diameter of about 5/16", while fluidization tube 358 can have an internal diameter of about 3/8". One of ordinary skill in the art will recognize that additional internal diameters of the redirection tube and the fluidization tube are contemplated and are within the scope of the present disclosure. Additionally, the internal diameter of the fluidization tube and the redirection tube can be guided by the flow rate requirements of a particular fuel cell system. As shown in FIG. 7, the lower portion of fluidization apparatus 351 can comprise sloped walls which facilitate accumulation of fuel particles in the area near fluidization jet 354. In some embodiments, the walls can have a slope from about 25 to about 75 degrees, while in other embodiments the walls can have a slope from about 40 to about 60 degrees.

Electrolyte can be pumped through inlet tube 352 to fluidization jet 354 and into fluidization apparatus 351. The electrolyte stream entering apparatus 351 from fluidization jet 354 can entrain a portion of the fuel particles located within fluidization apparatus 351 and transport the fuel particles through opening 360 into redirection tube 356. The entrained fuel particles can travel through redirection tube 356 into fluidization tube 358, where the change in area between redirection tube 356 and fluidization tube 358 can fluidize the fuel particles. The fluidized fuel particles can flow out of feed tube 358 and be provided to another component of a fuel cell system, such as a cell stack. As will be described below, a splitter element can be positioned on the end of fluidization tube 358 to divide the fuel particle and electrolyte flow into multiple flow paths.

Figure 8A:
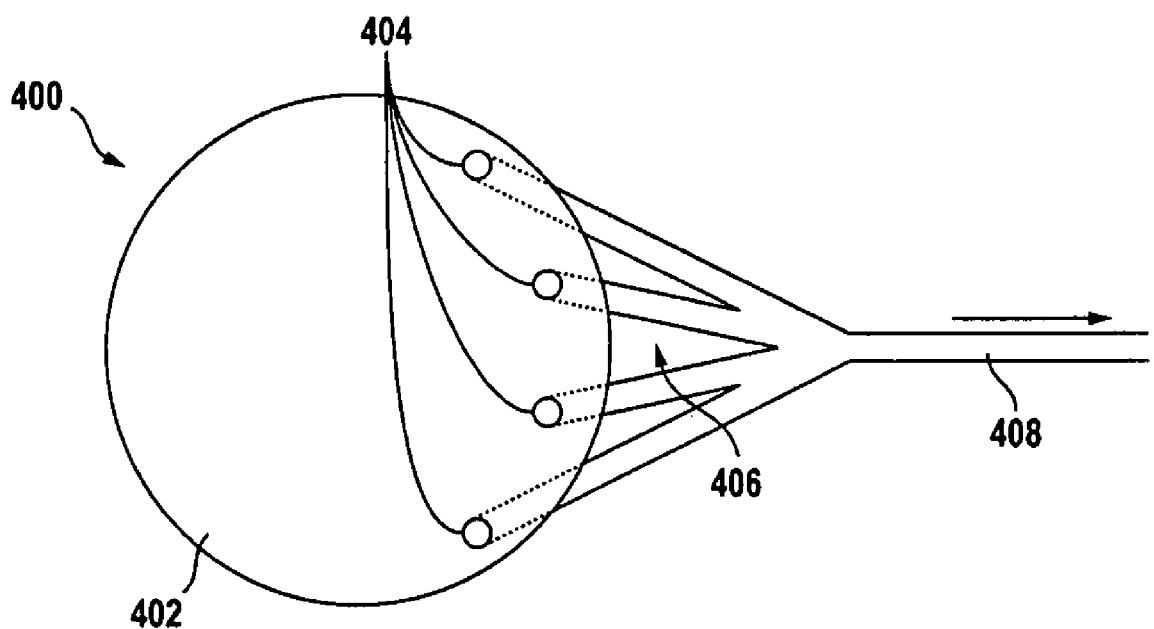
FIG. 8A is a perspective view of a splitter element having a plurality of feed holes.

With respect to FIG. 8A, a splitter 400 is shown that can be connected to the containers shown in FIGS. 2-4 and 7 to reduce fuel and electrolyte starvation that can occur when a clog obstructs the fuel cell piping system. With respect to the fluidization apparatuses shown in FIGS. 2-4, splitter 400 can be positioned in the fluidization apparatuses such that fuel and electrolyte stream exiting the apparatuses through the feed tubes are split into multiple streams or flow paths. For example, a splitter can be positioned inside fluidization apparatus 151 of FIG. 2 such that the fuel and electrolyte stream exiting apparatus 151 through feed tube 158 is divided into multiple flow pathways.

Figure 8B:
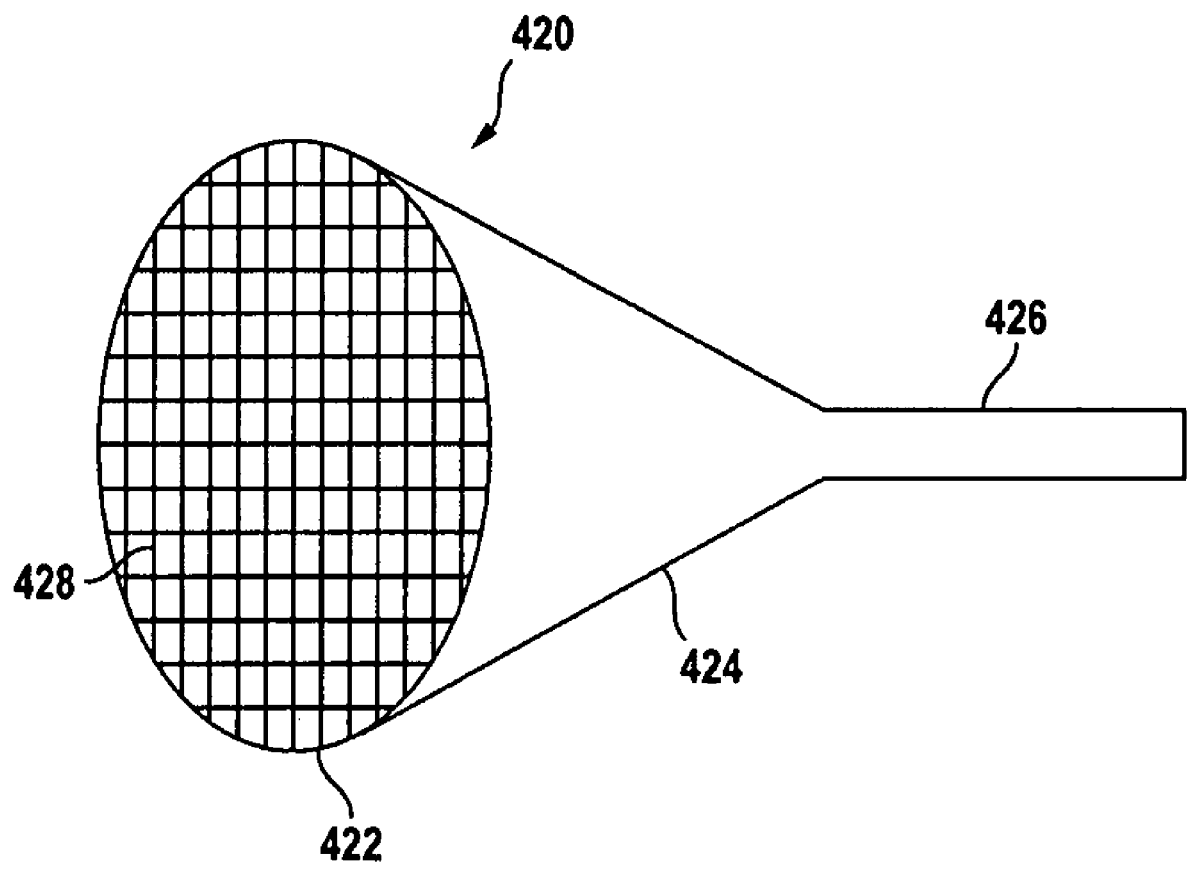
FIG. 8B is a perspective view of an alternative embodiment of a splitter element having a gating over a large opening.

With respect to FIG. 7, as described above, splitter 400 can be attached to one end of fluidization tube 358 such that the flow of fuel and electrolyte exiting fluidization tube 358 can be split into multiple flow paths. As shown in FIG. 8A, splitter 400 comprises a body element 402 having a plurality of feed holes 404 that allow passage of fluids through body element 402. Generally, a plurality of suction tubes 406 are connected to the plurality of feed holes 404. In one embodiment, the plurality of suction tubes 406 converge to connect the plurality of suction tubes to a flow tube 408. In some embodiments, the size of feed holes 404 can be selected to prohibit passage of fuel particles that exceed a desired size, which can reduce the possibility of large fuel particles clogging the piping system of the fuel cell. Additionally, even if one of the flow pathways becomes clogged with fuel particles, the block will not affect the other pathways and therefore cell function will not be significantly impaired. An alternative embodiment of a splitter is shown in FIG. 8B. Splitter 420, comprises an enlarged opening 422 connected to a funnel section 424, which connects to a flow tube 426. A grating or the like 428 covers opening 422. The spacings of the gratting can be selected to appropriately block large particles from entering flow tube 426. One of ordinary skill in the art will recognize that additional splitter structures exist and are within the scope of the present disclosure.

The fluidization apparatuses shown in FIGS. 2-7 can be composed of any material suitable for use in electrochemical applications that is inert with respect to the fuel and electrolyte contained within the containers. Suitable materials include homopolymers, copolymers, block copolymers, metals, metal alloys and combinations thereof Suitable polymers include, for example, polyethylene, ultra high molecular weight polyethylene (UHMWPE), poly(vinyl chloride), poly(tetrafluoroethylene), poly(vinylidene fluoride), polypropylene, polycarbonates, polyurethanes, and blends and copolymers thereof. The containers can have any reasonable shape, however, as noted above, the lower portion of the containers are generally sloped to facilitate the flow of fuel particles towards the fluidization jet. The size of the containers can be guided by the corresponding size and fuel requirements of the intended electrochemical cell stacks.

The feed tubes, spout tubes, fuel inlets, fuel outputs and the like described above are generally hollow tubular structures having a selected cross section and a length suitable to connect appropriate components of the system. The tubes can be composed of any material suitable for use in electrochemical cell applications such as, for example, metals, polymers and combinations thereof. Suitable polymers include, for example, polyethylene, polypropylene, poly(vinylidene fluoride), poly(tetrafluoroethylene), poly(vinyl chloride) and blends and copolymers thereof. The tubes can have a circular cross section, an oval cross section, a rectangular cross section or the like. One of ordinary skill in the art will recognize that no particular cross sectional shape of the tubes is required by the present disclosure. The internal diameter of the tubes can be guided by the mass flow rate requirements of a particular fuel cell design. As described above, increasing the internal diameter of the spout tube and/or the feed tube generally increase the mass flow rate of the fuel particles, while decreasing the internal diameter of the tubes generally decreases the mass flow rate of the fuel particles.

As described previously, electrolyte can be provided to the fluidization jet by a fluidization pump, and fluidized fuel and electrolyte can be pumped out of the feed tube by a fuel delivery pump. The term pump is being used in its broad sense to include any mechanical device capable of applying a motion to a fluid. Suitable pumps include, for example, piston pumps, diaphragm pumps, and the like. In some embodiments, the fluidization pump and the fuel delivery pump can be the same type of pump, while in other embodiments the fluidization pump can be different than the fuel delivery pump. The fluidization jet nozzle can be any mechanical structure or plumbing exit configuration suitable for creating a pressurized electrolyte stream. Suitable fluidization jet nozzles include, for example, a square or sharp pipe outlet, such as a Vernay labs duckbill valve (Verney Laboratories, Inc.) or the like.

Electrochemical Cell Stacks and Piping Systems

As described above, the fuel cell systems of the present disclosure generally comprise a fluid delivery system, an electrochemical cell stack and a piping system connecting the electrochemical cell stack to the fluid delivery system. An electrochemical cell generally comprises a negative electrode or anode, a positive electrode or cathode and a bipolar plate separating the anode and the cathode. An electrochemical cell stack comprises one or more electrochemical cells connected in series such that the anode of one cell is electrically connected to the cathode of an adjacent cell. In some embodiments, the electrode assemblies can comprise gas diffusion electrodes having active layers associated with backing layers. The active and backing layers of the gas diffusion electrodes are porous to gasses such that gasses can penetrate through the backing layer and into the active layer. However, the backing layer of the electrodes is generally sufficiently hydrophobic to prevent diffusion of the electrolyte solution into or through the backing layer. Gas diffusion electrodes suitable for use in metal-based fuel cells are generally described in co-pending application Ser. No. 10/364,768, filed on Feb. 11, 2003, entitled "Fuel Cell Electrode Assembly."

Figure 9:
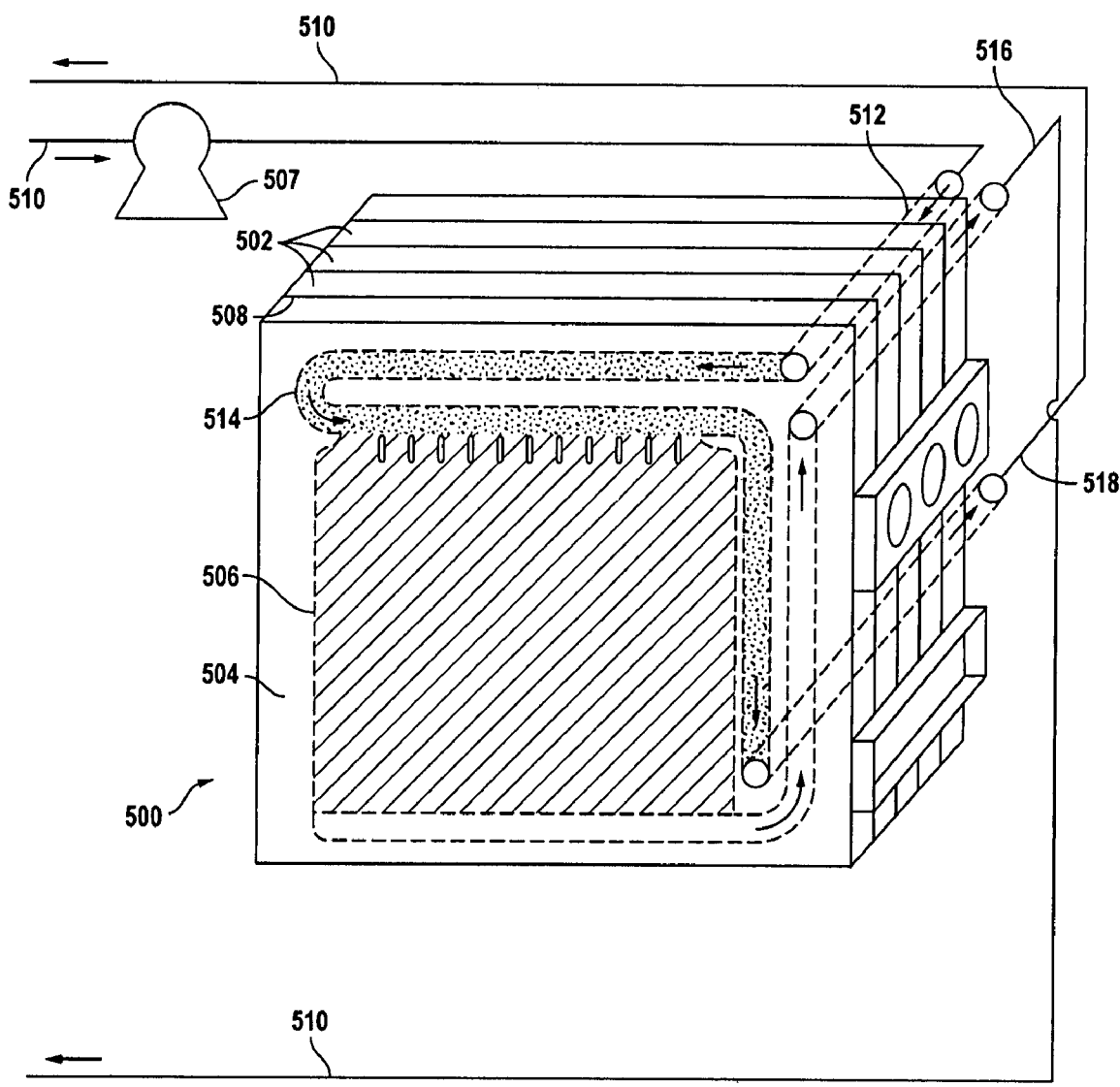
FIG. 9 is a schematic diagram of an electrochemical cell stack and a piping system connected to the electrochemical cell stack.

A representative embodiment of an electrochemical cell stack 500 is shown in FIG. 9. As shown in FIG. 9, electrochemical cell stack 500 comprises a stack of one or more cells 502, each generally defining a plane and coupled together in series. Metal-air fuel cell 502 interfaces with stack container 504. Each cell 502 includes a cathode 506 that is positioned at one side of cell 502 and a negative electrode 508 that is positioned at the opposite side of cell 502. The cathode and anode are separated by an electrically insulating separator. Additionally, adjacent cells in electrochemical cell stack 500 can be coupled in series by bipolar plates, which as noted above, can connect the anode of one cell to the cathode of an adjacent cell.

Electrochemical cell stack 500 can be incorporated into the fuel cell system of FIG. 1 by connecting piping system 510 of electrochemical cell stack 500 to the flow inlet(s) and flow outlet(s) of an appropriate fluid delivery system. For example, fluidized metal fuel and electrolyte can be can be supplied from a fluid delivery system, such as the systems described above in FIGS. 2-7, through piping system 510 and into inlet manifold 512 of cell stack 500. Fuel delivery pump 507 can be provided to facilitate flow of fluid from the fluid delivery system into cell stack 500. Fuel outlet 516 can provide a pathway for electrolyte and reacted fuel out of stack 500, while fuel outlet 518 can provide a pathway for un-reacted fuel particles and electrolyte out of stack 500. In one embodiment, fuel outlet 516 can be used as line 118 in the system shown in FIG. 1, while fuel outlet 518 can be used as line 120 in the system shown in FIG. 1. Piping system 510 can comprise one or more fluid connecting devices, e.g., tubes, conduits, and the like, for connecting the components of a system. The interface between cathode 506 and piping system 510 through inlet manifold 512 is shown in phantom lines in FIG. 9. Inlet manifold 512 can distribute fuel, such as fluidized zinc pellets, to the anode beds of the cells via filling tubes 514. Fuel cell stacks are further described in co-pending application Ser. No. 10/437,481, filed on May, 14, 2003, entitled "Combined Fuel Cell and Battery," which is hereby incorporated by reference.

Fluidizing Fuel Particles

As described above, the fuel cell systems of the present disclosure generally comprise a fluidization pump and an associated fluidization jet which creates a electrolyte stream capable of fluidizing fuel particles located within a container. Additionally, the fuel cell systems can further comprise a fuel delivery pump, which can pump a portion of the fluidized fuel particles and electrolyte out of the container to another component of the fuel cell system, such as an electrochemical cell stack. The use of both a fluidization pump and a fuel delivery pump allows the fuel particle mass flow to be controlled independently of the overall flow rate of electrolyte through the fuel cell system.

The fluidization of the fuel particles within the container generally creates regions fluidized fuel particles of high concentration and regions of lower concentration. The feed tube can be positioned in a region of known higher concentration of fuel particles, or a region of lower concentration of fuel particles, depending on the fuel particle mass flow rate requirements of a particular fuel cell system. Additionally, increasing the pumping rate of the fluidization pump increases electrolyte flow through fluidization jet into the container, which in some embodiments can increase the concentration of fluidized particles. Increasing the concentration of fluidized fuel particles can increase the fuel particle mass flow rate. In some embodiments, the volume fraction of particles in the fluidization container range from about 0.01 to about 3 volume percent and in further embodiments from about 0.1 to about 0.5 volume percent metal fuel particles. In some embodiments, the flow to the fuel cell can have from about 0.001 to about 3 volume percent, and in further embodiments from about 0.025 to about 0.2 volume percent fuel particles. A person of ordinary skill in the art will recognize that additional ranges of fuel particle concentrations within the specified ranges are contemplated and are within the present disclosure. In addition, the size of the tubing can influence flow rates. In some embodiments, the fluidization pump can be programmed to continuously supply electrolyte to the container, while in other embodiments the fluidization pump can intermittently supply electrolyte to the container.

The fuel delivery pump directs the flow of fluidized fuel particles out of the fluidization apparatus to other components of a fuel cell system. The fuel delivery pump can be programmed to continuously pump fluidized fuel particles with electrolyte out of the container. Alternatively, the fuel delivery pump can be programmed to intermittently pump fluidized fuel particles with electrolyte of the fluidization apparatus. The fluidized fuel generally is delivered to a fuel cell stack. Depending on the flow rate through the stack itself, all or a portion of the fluidized fuel reaching the stack flows through an anode bed. Additional flow of the fluidized particles and electrolyte can pass from the cell stack for return to the fluidization chamber, a storage container or a combination thereof. The fuel particles flowing through the anode bed are generally at least partially consumed. The consumed fuel and electrolyte flows from the anode bed and can be returned, for example, to the fluidization chamber, to a regeneration apparatus to regenerate the fuel particles, to a storage container or a combination thereof.

EXAMPLES

Example 1

The following example illustrates how feed hole placement and size affects the mass flow rate of the fuel particles. A fluidization apparatus was constructed as shown in FIG. 2 with a ½ inch internal diameter spout tube and a feed tube that was positioned about 2 inches above the spout tube. The feed tube had a pellet feed hole positioned directly above the spout tube with a diameter of about 10 mm. The fluidization apparatus contained a KOH electrolyte and zinc fuel pellets. The feed tube of the apparatus was connected to dummy stacks to monitor the mass flow rate of the zinc particles out of the container. In this example the mass flow rate was monitored visually by observing the zinc particles flowing through the dummy cells. The darker the solution of zinc particles and electrolyte flowing through the dummy stacks corresponds to higher zinc mass flow through the stacks. The resulting flow rate of zinc particles using a 10 mm feed hole placed directly above the spout tube was very high. The feed hole was then reduced in size to 5 mm and positioned about 1 inch away from the center of the spout tube. The solution flowing through the dummy stacks was not as dark as the previous run, indicating that the mass flow rate of the zinc pellets through the dummy stacks was lower.

Example 2

Figure 10:
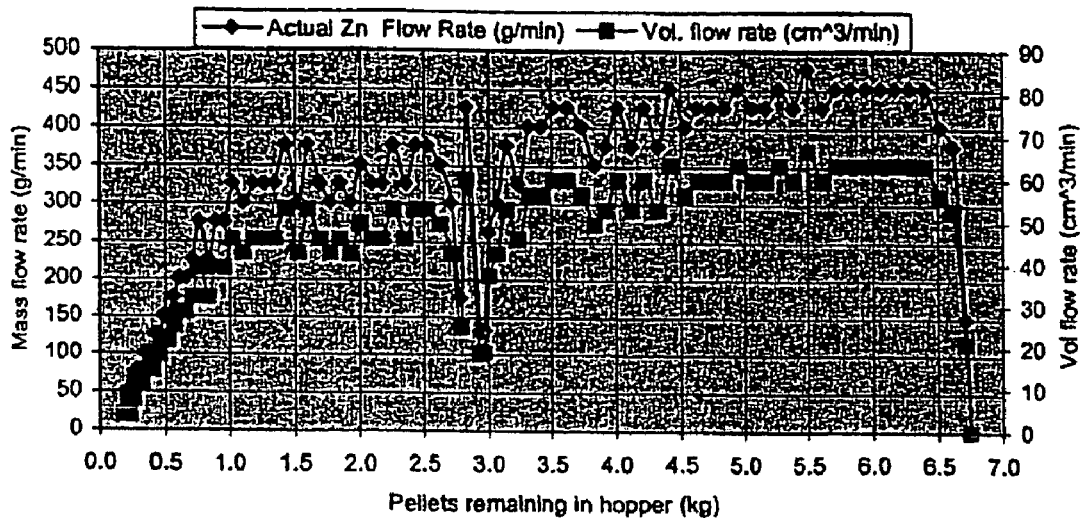
FIG. 10 is a mass flow rate graph for a fluidization apparatus of FIG. 2 where the feed hole was positioned downstream from the spout tube.
Figure 11:
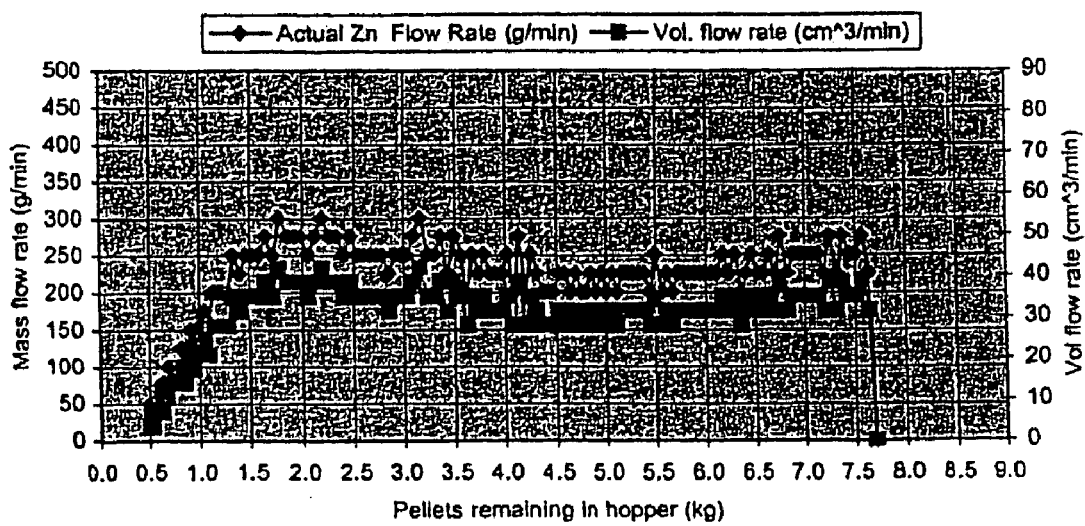
FIG. 11 is a mass flow rate graph for a fluidization apparatus of FIG. 2 where the feed hole was removed and the feed tube was open at one end.

This example illustrates how removal of the feed hole affects the mass flow rate through a fuel cell system. A fluidization apparatus was constructed as shown in FIG. 2 with a ½ inch gap between the spout tube and the apparatus. A feed tube was positioned above the spout tube. The feed tube had a pellet feed hole positioned 1 inch downstream from the spout tube with a diameter of about 5 mm. The apparatus contained a KOH electrolyte and zinc fuel pellets. The feed tube of the apparatus was connected to a container that was placed upon a scale to measure the mass flow rate of the zinc particles. As shown in FIG. 10, the mass flow rate of the zinc was over 350 g/min. The feed hole 166 was then removed to test the mass flow rate when the zinc is sucked through the end of the feed tube 158. As shown in FIG. 11, removing the feed hole reduced the mass flow rate of the zinc particles.

Example 3

Figure 12:
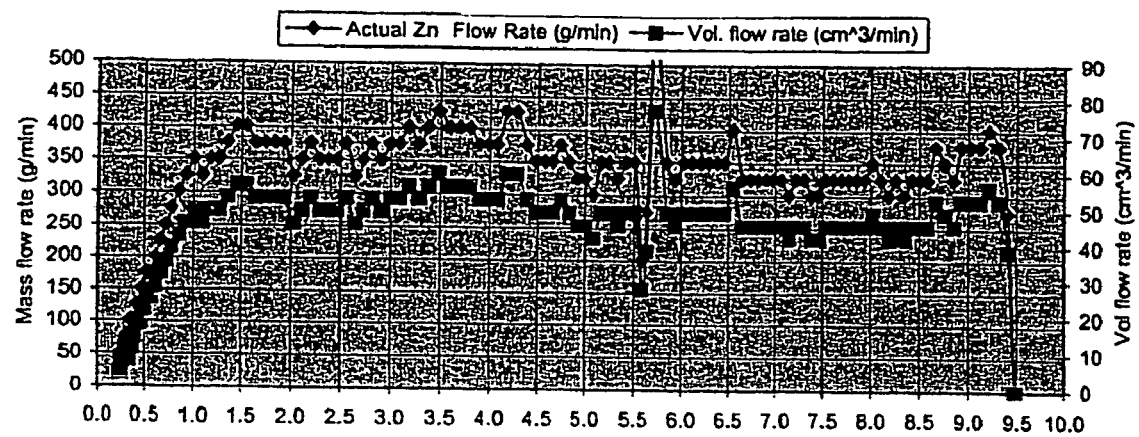
FIG. 12 is a mass flow rate graph for a fluidization apparatus of FIG. 2.
Figure 13:
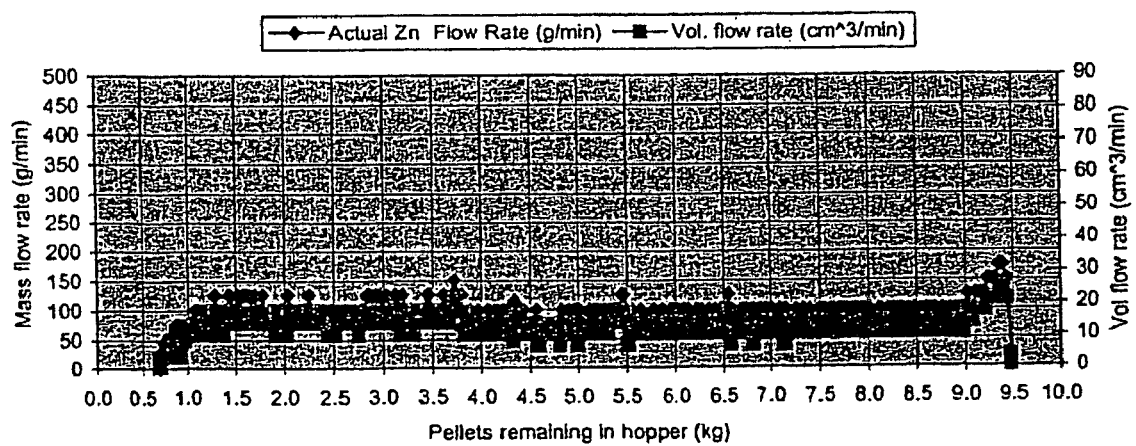
FIG. 13 is a mass flow rate graph for a fluidization apparatus of FIG. 2 where the feed tube was extended from the original length used in FIG. 12.
Figure 14:
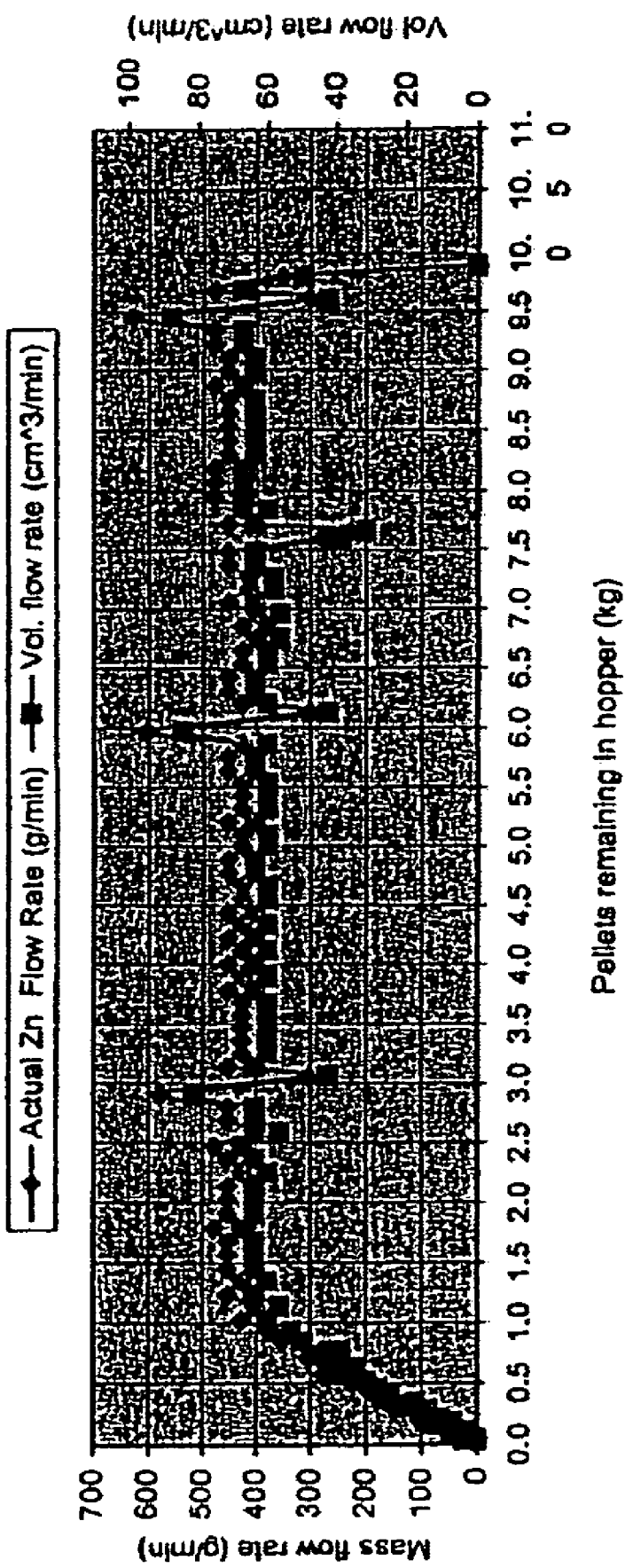
FIG. 14 is a mass flow rate graph for a fluidization apparatus of FIG. 2 where the feed tube was shortened from the original length used in FIG. 12.

This example demonstrates the effect of extending and shortening the feed tube on the zinc particle mass flow. Additionally, this example shows that regions of higher and lower concentration of zinc particles exist within the fluidization apparatus. A fluidization apparatus was constructed as shown in FIG. 2 with a ½ inch gap between the spout tube and the bottom of the apparatus. A feed tube was positioned above the spout tube. The feed tube was open at one end to allow zinc particles to be sucked into the feed tube. The apparatus contained a KOH electrolyte and zinc fuel pellets. FIG. 12 shows the measured mass flow rate of the zinc particles out of the container. The apparatus system was then adjusted by extending the feed tube by 1 inch. FIG. 13 shows that the measured mass flow rate of the zinc particles was about 100 g/min with the longer feed tube compared with a flow rate of about 350 g/min with the shorter feed tube. The feed tube was then shortened by 1 inch from the original length, and the mass flow rate was measured again. As shown in FIG. 14, the mass flow rate of the zinc particles was about 450 g/min with the shortened feed tube compared with the flow rate of 350 g/min with the original length tube.

Example 4

Figure 15:
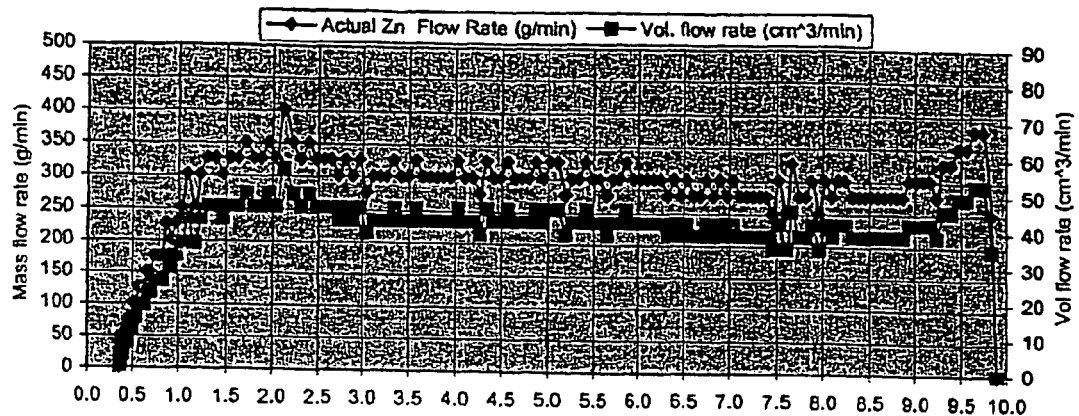
FIG. 15 is a mass flow rate graph for a fluidization apparatus of FIG. 2 with a ½ inch gap between the spout tube and the bottom of the fluidization apparatus.
Figure 16:
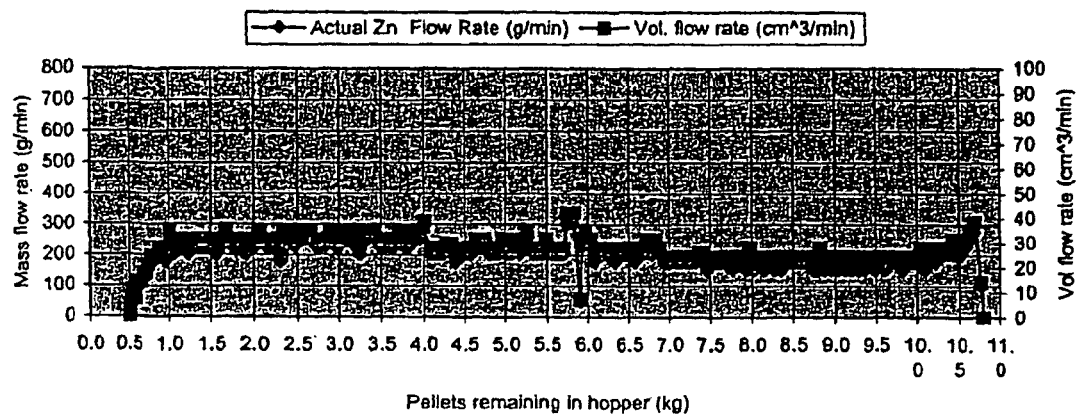
FIG. 16 is a mass flow rate graph for a fluidization apparatus of FIG. 2 with a ¼ inch gap between the spout tube and the bottom of the container.
Figure 17:
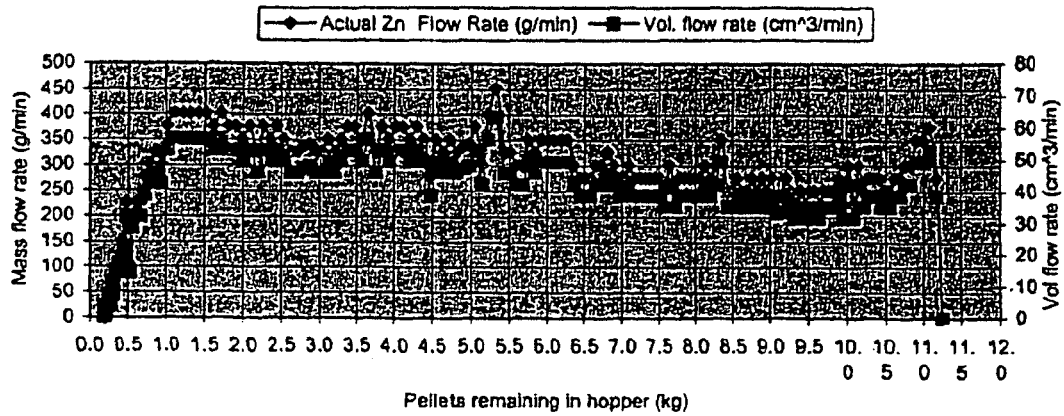
FIG. 17 is a mass flow rate graph for fluidization apparatus of FIG. 2 with a ¾ inch gap between the spout tube and the bottom of the fluidization apparatus.

This experiment was conducted to determine the effect of the spout tube position on the mass flow rate of the zinc particles. A fluidization apparatus was constructed as shown in FIG. 2 with a ½ inch gap between the spout tube and the bottom of the apparatus. A feed tube was positioned above the spout tube. The feed tube was open at one end to allow zinc particles to be sucked into the feed tube. The apparatus contained a KOH electrolyte and zinc fuel pellets. As shown in FIG. 15, the mass flow rate of the zinc particles was around 300 g/min. The gap between the spout tube and the bottom of the apparatus was then reduced to ¼ inch and the mass flow rate of the zinc was measured again. As shown in FIG. 16, decreasing the spout tube gap lowered the mass flow rate of the zinc particles to about 250 g/min. The spout tube gap was then adjusted so that the gap between the bottom of the apparatus and the spout tube was ¾ inch. As shown in FIG. 17, increasing the distance between the spout tube and the bottom of the apparatus increased the mass flow rate of the zinc particles to about 350 g/min.

Example 5

Figure 18:
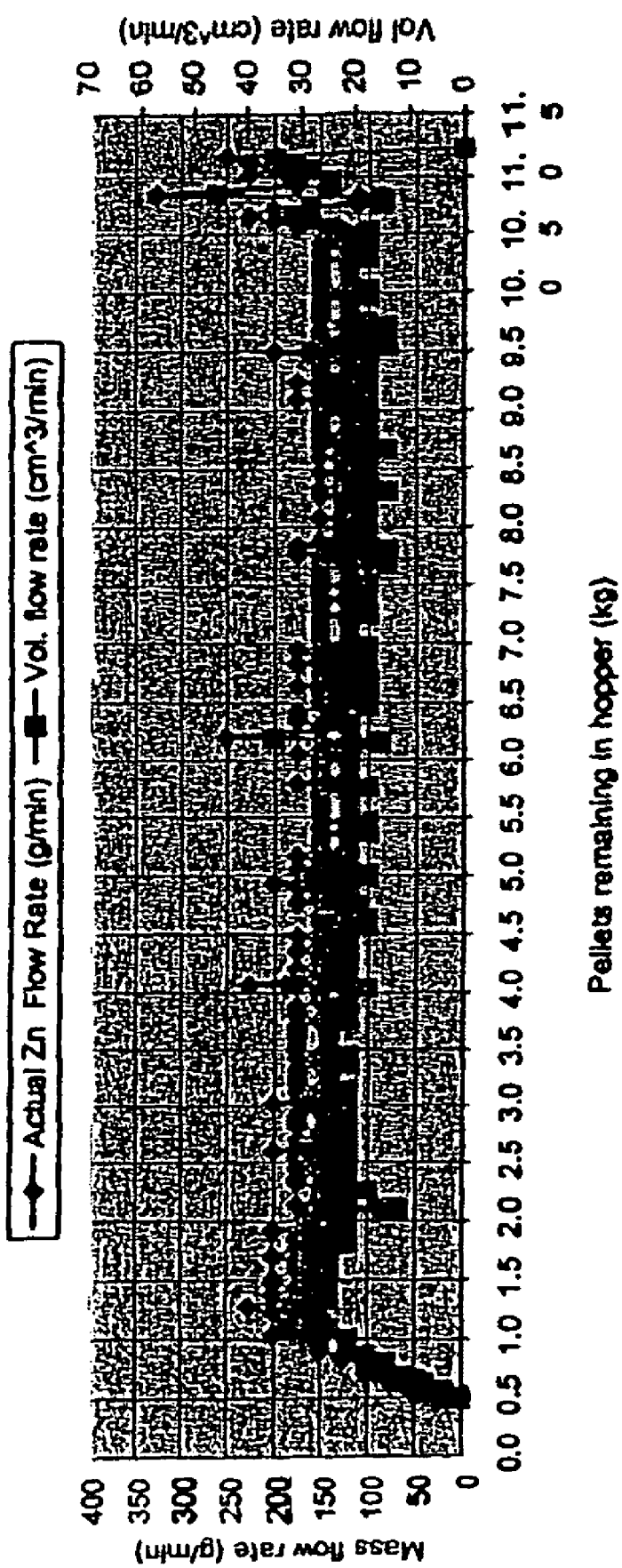
FIG. 18 is a mass flow rate graph for a fluidization apparatus of FIG. 3 with a ½ inch gap between the spout tube and the bottom of the container and with the feed tube removed and a 49 degree elbow fitted onto the bulkhead pointing upwards.

This test was conducted to determine the effects of removing the feed tube on the mass flow rate of the zinc. A fluidization apparatus was constructed as shown in FIG. 3 with a ½ inch gap between the spout tube and the bottom of the container. The feed tube was removed and a 49 degree elbow was fitted on the bulkhead pointing upward. The baffle was positioned slightly higher than the 49 degree elbow. The apparatus contained KOH electrolyte and zinc pellets. As shown in FIG. 18, the mass flow rate of the zinc particles was about 175 g/min when the feed tube is removed in comparison with a value of about 300-350 g/min with the feed tube.

The embodiments and examples above are intended to be illustrative and not limiting. Additional embodiments are within the claims. Although the present invention has been described with reference to particular embodiments, workers skilled in the art will recognize that changes may be made in form and detail without departing from the spirit and scope of the invention.

We claim:

1. A fuel cell system comprising:
   a fluidization apparatus having therein metal particles and electrolyte;
   an electrochemical cell stack in fluid communication with the fluidization apparatus, the stack comprising an anode and a cathode;
   a fuel delivery pump controlling total flow rate of the metal particles and the electrolyte into the electrochemical cell stack;
   a fluidization pump varying the mass flow rate of the metal particles into the electrochemical cell stack independently of the total flow rate controlled by the fuel delivery pump, wherein the fluidization pump provides a stream comprising electrolyte to the fluidization apparatus at an orientation suitable for fluidizing at least a portion of the metal particles in the fluidization apparatus;
   a feed tube that passes through a surface of the fluidization apparatus providing a flow pathway for the fluidized metal particles and electrolyte out of the fluidization apparatus, wherein a portion of the fluidized metal particles and electrolyte can be delivered to the anode of the electrochemical cell stack by the fuel delivery pump; and
   a splitter element connected to the feed tube, the splitter element having a plurality of openings allowing fluidized metal particles and electrolyte to flow into the feed tube through multiple flow paths.

2. The fuel cell system of claim 1 wherein the fluidization apparatus further comprises a fluidization jet connected to the fluidization pump for introducing the electrolyte stream into the fluidization apparatus.

3. The fuel cell system of claim 2 wherein the fluidization jet is oriented in an upward direction.

4. The fuel cell system of claim 1 wherein the metal particles comprise zinc, an alloy of zinc or a combination thereof.

5. The fuel cell system of claim 2 wherein the fluidization apparatus further comprises a redirection tube and a fluidization tube, the redirection tube directing the fluidized metal particles from the fluidization jet into the fluidization tube.

6. The fuel cell system of claim 5 wherein the fluidization tube has an inner diameter greater than an inner diameter of the redirection tube.

7. The fuel cell system of claim 2 wherein the fluidization apparatus further comprises sloped interior walls directing the metal particles by gravity toward the electrolyte stream of the fluidization jet.

8. A fuel cell system comprising:
   a fluidization apparatus having therein metal particles and electrolyte;
   an electrochemical cell stack in fluid communication with the fluidization apparatus, the stack comprising an anode and a cathode;
   a fuel delivery pump; and
   a fluidization pump, wherein the fluidization pump provides a stream comprising electrolyte to the fluidization apparatus at an orientation suitable for fluidizing at least a portion of the metal particles in the fluidization apparatus, wherein a portion of the fluidized metal particles and electrolyte can be delivered to the anode of the electrochemical cell stack by the fuel delivery pump, and
   wherein the fluidization apparatus further comprises a redirection tube and a fluidization tube, the redirection tube having a first end and a second end and an internal diameter, wherein the first end is positioned such that at least a portion of the metal particles to be fluidized enter the first end, and wherein the second end is connected to the fluidization tube, the fluidization tube having a larger internal diameter than the internal diameter of the redirection tube.

9. The fuel cell system of claim 8 wherein the redirection tube passes through a surface of the fluidization apparatus providing a flow pathway for the fluidized metal particles and electrolyte out of the fluidization apparatus.

10. The fuel cell system of claim 9 further comprising a splitter element connected to the fluidization tube, the splitter element having a plurality of openings allowing fluidized metal particles and electrolyte to flow through multiple flow paths.

11. The fuel cell system of claim 10 wherein the plurality of openings comprises a grating.

12. The fuel cell system of claim 10 wherein the splitter element comprises a surface perforated by the plurality of openings.

13. The fuel cell system of claim 12 further comprising a plurality of suction tubes, each suction tube connected to one of the openings.

14. A fuel cell system comprising:
a fluidization apparatus containing an electrolyte solution and having a fuel inlet for receiving metal particles and an electrolyte solution outlet;
an electrochemical cell stack in fluid communication with the fluidization apparatus;
a fluidization pump circulating the electrolyte solution in a circulation loop through the fluidization apparatus to fluidize at least a portion of the metal particles;
a fuel delivery pump for supplying the fluidized metal particles to the electrochemical cell stack; and
a fluidization input line connected to the electrolyte solution outlet and to the fluidization pump inlet to complete the circulation loop;
a feed tube connected to the fuel delivery pump, the feed tube having an opening disposed within the fluidization apparatus for collecting a portion of the fluidized metal particles; and
a splitter element connected to the feed tube, the splitter element having a plurality of openings allowing fluidized metal particles and electrolyte to flow into the feed tube through multiple flow paths.

15. The fuel cell system of claim 14 further comprising a fluidization jet connected to the fluidization pump for jetting the electrolyte solution into the fluidization apparatus.

16. The fuel cell system of claim 15 wherein the fluidization apparatus further comprises sloped interior walls directing the metal particles by gravity toward the fluidization jet.

17. The fuel cell system of claim 16 further comprising a spout tube having a first and second end, the first end positioned to receive at least a portion of the fluidized metal particles.

18. The fuel cell system of claim 17 further comprising a baffle redirecting at least a portion of the fluidized metal particles exiting the second end of the spout tube.

19. The fuel cell system of claim 18 wherein the splitter element comprises a surface perforated by the plurality of openings.

20. The fuel cell system of claim 19 further comprising a plurality of suction tubes, each suction tube connected to one of the openings and leading to the feed tube.

21. The fuel cell system of claim 15 wherein the fluidization apparatus further comprises a redirection tube and a fluidization tube, the redirection tube directing fluidized metal particles from the fluidization jet into the fluidization tube.

22. The fuel cell system of claim 21 wherein the fluidization tube has an inner diameter greater than an inner diameter of the redirection tube.

23. A fuel cell system comprising:
a fluidization apparatus having therein metal particles and electrolyte;
an electrochemical cell stack in fluid communication with the fluidization apparatus, the stack comprising an anode and a cathode;
a fuel delivery pump controlling total flow rate of the metal particles and the electrolyte into the electrochemical cell stack; and
a fluidization pump varying the mass flow rate of the metal particles into the electrochemical cell stack independently of the total flow rate controlled by the fuel delivery pump;
wherein the fluidization apparatus includes a redirection tube connected to a fluidization tube, the fluidization pump causing a flow of the metal particles into the redirection tube, and the fluidization tube having a larger internal diameter than an internal diameter of the redirection tube.

* * * * *